United States Patent [19]

Segar

[11] Patent Number: 5,907,106
[45] Date of Patent: May 25, 1999

[54] METHOD AND APPARATUS FOR MEASURING STRAIN AND LOAD ON ROTATING SHAFTS

[75] Inventor: Raymond C. Segar, Sterling Heights, Mich.

[73] Assignee: Chrysler Corporation, Auburn Hills, Mich.

[21] Appl. No.: 09/083,932

[22] Filed: May 22, 1998

[51] Int. Cl.⁶ .................................................. G01L 1/22
[52] U.S. Cl. .............................. 73/862.338; 73/862.324
[58] Field of Search ...................... 73/862.324, 862.325, 73/862.338

[56] References Cited

U.S. PATENT DOCUMENTS

| | | | |
|---|---|---|---|
| 4,529,312 | 7/1985 | Pavlath et al. | 356/350 |
| 4,630,354 | 12/1986 | Staviski | 29/566.4 |
| 4,767,164 | 8/1988 | Yeung | 303/91 |
| 4,962,495 | 10/1990 | Gibbons et al. | 370/1 |
| 5,422,477 | 6/1995 | de La Chapelle et al. | 250/277.12 |
| 5,438,882 | 8/1995 | Karim-Panahi et al. | 73/862.324 |
| 5,672,834 | 9/1997 | Searle et al. | 73/862.338 |
| 5,705,757 | 1/1998 | Wozniak | 73/862.338 |

FOREIGN PATENT DOCUMENTS

| | | |
|---|---|---|
| 479970 | 8/1975 | U.S.S.R. . |
| 637737 | 12/1978 | U.S.S.R. . |

*Primary Examiner*—Elizabeth L. Dougherty
*Attorney, Agent, or Firm*—William J. Coughlin

[57] ABSTRACT

An optical strain gauge for measuring strain and torque on a rotating member. The apparatus includes a plurality of electrically resistive torque sensing elements secured to a rotating shaft which generate an output signal to a light. The magnitude of the light varies in accordance with the torque or strain sensed by the sensing elements. The optical signal transmitted by the light is received by an optical transmitting element having a plurality of fiber optic strands. The fiber optic strands pick up the received light and transmit the light to a photo sensing element which then transmits the signal to an intensity meter. The intensity meter provides an indication of the magnitude of the optical signal, and thus the magnitude of the sensed torque or strain. The apparatus does not require conventional slip rings or other like devices and is not susceptible to electromagnetic interference or other objectionable electrical phenomena.

13 Claims, 2 Drawing Sheets

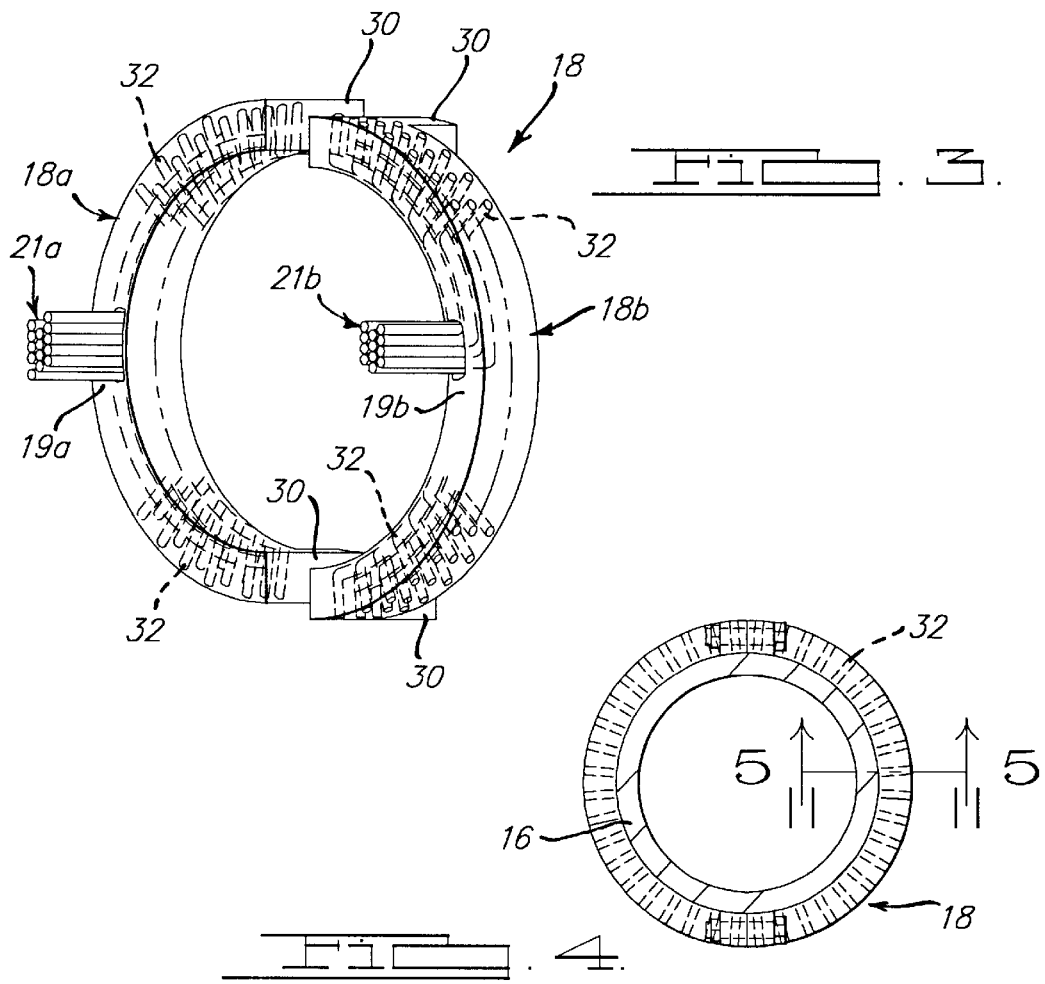
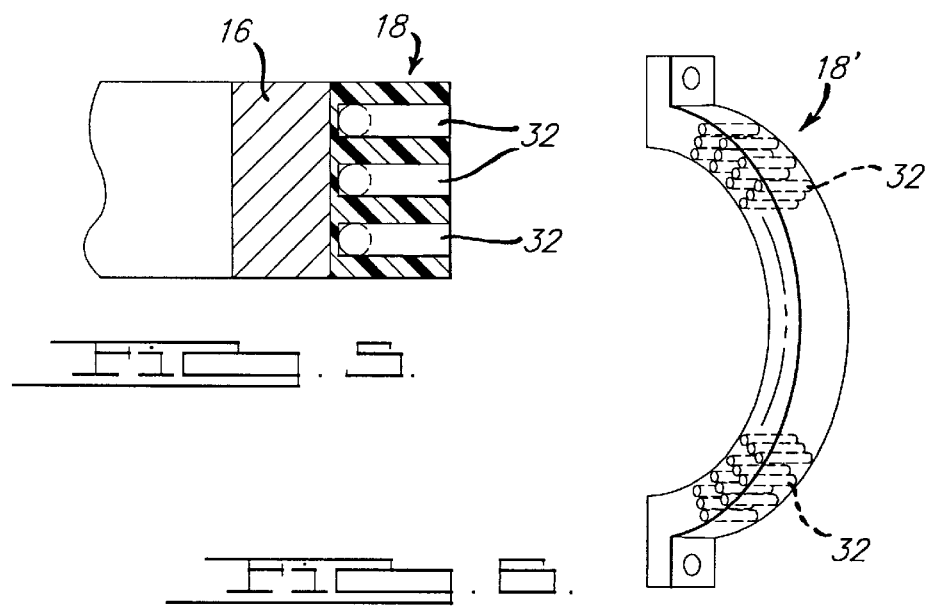

METHOD AND APPARATUS FOR MEASURING STRAIN AND LOAD ON ROTATING SHAFTS

BACKGROUND OF THE INVENTION

1. Technical Field

This invention relates to apparatus for detecting strain and torque on various members, and more particularly to an apparatus and method for detecting strain and/or torque on a rotating member such as an input shaft of a transmission, and for generating optical signals in accordance with the sensed strain and/or torque without the use of slip rings and other devices commonly required in such applications.

2. Discussion

Strain gauges are used in a variety of applications to measure the strain and/or torque experienced by various members. Many such applications are in connection with the testing of various components of an automobile, such as various shafts and members used in engines and transmissions of motor vehicles.

In previous applications, it has generally been necessary to use some form of slip ring or like element which is attached to the rotating shaft being sensed. The slip ring generally receives electrical signals from electrical sensing elements. The slip ring transmits the electrical signals via brushes or other like components to test equipment where the electrical signals can be converted into useful information to indicate the strain and/or torque experienced by the member being sensed.

In many applications, such as with transmissions, it is desirable to measure the strain and/or torque experienced by, for example, an input shaft of the transmission during operation. With most transmissions used with motor vehicles, space is very limited adjacent the input shaft, thus making it difficult and, in some instances, impossible to use conventional slip rings. As will also be appreciated, the brushes used with slip rings are also subject to wear and thus require periodic replacement. Various forms of strain and/or torque sensing systems are disclosed in the following patents, the disclosure of each of which is hereby incorporated by reference:

U.S. Pat. Nos. 4,529,312, 4,630,354,
4,767,164, 4,962,495,
5,422,477, 5,438,882

It would therefore be highly desirable to provide some form of strain and/or torque sensing apparatus and method which is capable of being used with a wide variety of members, and particularly with a rotating member such as an input shaft of a transmission, without requiring the use of slip rings and other electromechanical devices. It would further be highly desirable if such an apparatus and method could be employed which makes use of optical signals which are not susceptible to electrical interference and other objectionable phenomena that previously developed sensing systems must be concerned with.

It would be further highly desirable if an apparatus and method for sensing strain and/or torque on rotating members could be provided which makes use of a minimum number of independent components which facilitate use in complex components, such as transmissions, where space is very limited.

SUMMARY OF THE INVENTION

The present invention relates to an apparatus and method for sensing strain and/or torque on various members, and in particular on a rotating member such as an input shaft of a transmission. The apparatus generally comprises a plurality of resistive sensing elements secured to the member under test. The sensing elements are coupled to a circuit which generates an electrical signal in accordance with the strain or torque experienced by the member under test. The electrical signal is then used to drive a light source which generates an optical signal which varies in intensity in accordance with the magnitude of the sensed strain or torque. The optical signal is received by an optical transmitting element secured to the member under test and disposed adjacent the light source. The optical transmitting element is comprised of a member having a plurality of fiber optic strands which receive the optical signal from the light source and generates a light beam or "ring" of light adjacent the member under test transmit as the member rotates. This optical signal is monitored by an external sensor such as a photocell. The photocell is used to generate an electrical signal in accordance with the optical signal received from the optical transmitting element and to transmit the electrical signal to a suitable external measurement device.

In one preferred embodiment the optical transmitting element comprises a pair of U-shaped members which are adapted to be secured around the member under test. In this instance, the member under test is a rotating, circular shaft. The U-shaped members are secured tightly to the rotating shaft so as to rotate therewith. The optical sensing element is positioned adjacent the optical transmitting element such that optical signals transmitted by the fiber optic strands in the optical transmitting element may be received directly by the sensing element.

The apparatus and method of the present invention thus provides a means for obtaining information relating to the strain and/or torque experienced by a rotating member without the use of conventional slip rings, brushes and other like components which have traditionally been employed in sensing the stresses experienced by rotating members. Since optical signals are employed with the present invention, the invention is not susceptible to electrical interference, such as electromagnetic interference, which previously developed sensing systems could be susceptible to. The apparatus and method further comprises a limited number of independent components and can be used in systems or devices where space requirements are very limited.

BRIEF DESCRIPTION OF THE INVENTION

The various advantages of the present invention will become apparent to one skilled in the art by reading the following specification and subjoined claims and by referencing the following drawings in which:

FIG. 3 is a perspective view of the optical transmitting element shown in FIG. 2;

FIG. 4 is an end view of the optical transmitting element of FIG. 3;

FIG. 5 is a cross sectional end view in accordance with section line 5—5 in FIG. 4 illustrating the plurality of fiber optic strands embedded in one of the U-shaped members comprising the optical transmitting element; and FIG. 6 is a perspective view of an alternative preferred embodiment of the optical transmitting element in which the fiber optic strands are orientated generally parallel to the outer surface of the rotating shaft to which the U-shaped member is attached.

DETAILED DESCRIPTION OF THE PREFERRED EMBODIMENTS

Figure 1:
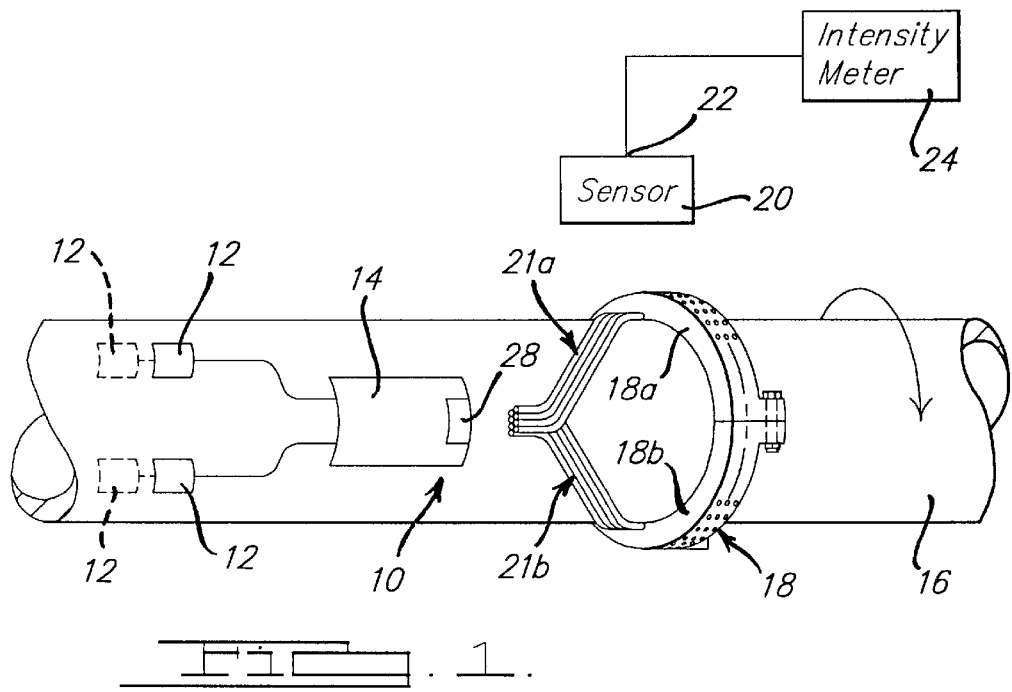
FIG. 1 is a diagram of the apparatus of the present invention secured to a portion of a rotating shaft.

Referring to FIG. 1, there is shown an apparatus 10 in accordance with a preferred embodiment of the present invention. The apparatus generally includes a plurality of resistive sensing elements 12 which are electrically coupled to a circuit board 14. The resistive sensing elements are fixedly secured to the member to be tested which, in this instance, it is illustrated as a rotating shaft 16. it will be appreciated immediately, that while a rotating shaft 16 has been shown, the apparatus of the present invention could be used with a wide variety of other members which must move during normal use. Also fixedly secured to the rotating shaft 16 is an optical transmitting element 18 which rotates with the shaft 16. Positioned closely adjacent the optical transmitting element 18 is an optical sensor 20. An output 22 of the sensor 20 is directed to an intensity meter 24 which provides an indication of the intensity of the optical signal received by the sensor 20.

Figure 2:
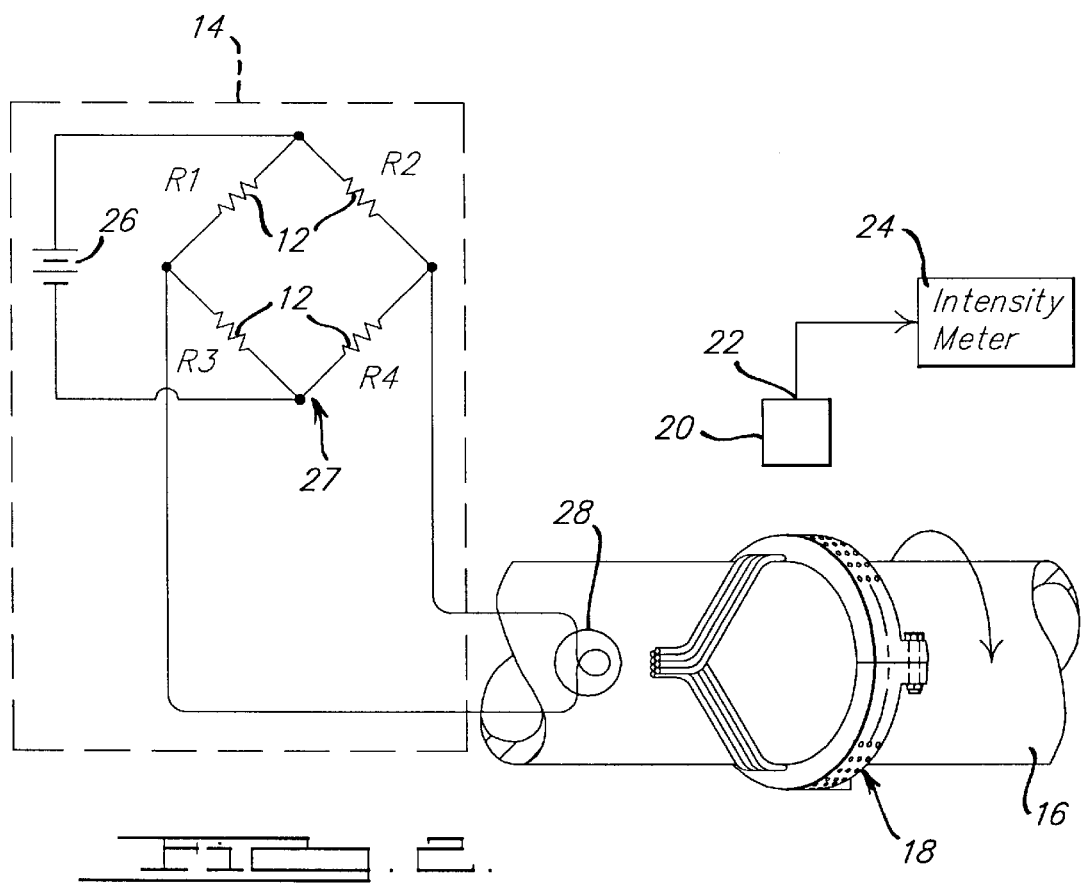
FIG. 2 is a schematic diagram of the circuit board secured to the rotating member in FIG. 1 illustrating the bridge circuit and the light source in greater detail.

Referring now to FIG. 2, the circuit board 14 can be seen to include a battery 26 which provides current to each of the resistive sensing elements 12. The resistive sensing elements 12 are configured in a balanced bridge 27, as is well understood in the art, and the output of the bridge 27 is coupled across a light 28. The battery 26 is preferably a very compact, light weight battery, such as a lithium battery, which is capable of being readily carried on the circuit board 14 and powering the apparatus 10 for a sufficient length of time. Thus, the circuit board 14 forms a very light and compact assembly which can be readily secured to the shaft 16.

Referring to FIG. 3, the optical transmitting element 18 is shown. The element 18 comprises a pair of generally U-shaped members 18a and 18b which may be secured together via conventional threaded fasteners at end portions 30, which extend generally parallel to the shaft 16. The two halves 18a and 18b are secured around the shaft 16 so as to be tightly clamped to the shaft 16. It will be appreciated that the curvature of each of the members 18a and 18b could be varied such that one size element 18 can be coupled to a plurality of shafts having differing diameters.

In each U-shaped member 18a and 18b is disposed a plurality of fiber optic strands 32. In the embodiment shown in FIG. 3, the strands 32 are disposed so as to extend radially from an outer surface of the rotating shaft 16. The fiber optic strands 32 are further spaced generally evenly from one another, as indicated in FIGS. 4 and 5. It is important to note that the end portions 30 of each member 18a and 18b also extend generally perpendicular to the remainder thereof. This permits the fiber optic strands 32 to extend essentially around the entire circumference of the rotating shaft 16. The strands 32 each exit through a side 19a and 19b of the members 18a and 18b, respectively, and form two bundles 21a and 21b of strands. In FIG. 1, it can be seen that the two bundles of strands 21a and 21b are drawn together such that light from the light 28 is picked up by strands 32 from each member 18a and 18b.

During calibration, it is preferable that the values of the resistive elements 12 be selected such that when no strain or torque is experienced by the rotating shaft 16, a positive voltage will be supplied to the light 28, and that a zero voltage output from the bridge circuit 27 corresponds to a maximum negative value. This is preferable because, since light does not have a "negative" value, if the bridge 27 circuit was configured such that a zero volt output from the bridge 27 fell within the center of the maximum negative and maximum positive signals capable of being produced, then the intensity meter 24 would not be able to distinguish whether an optical signal received from the optical transmitting element 18 is either positive or negative in value. Accordingly, by setting the values of the resistive elements 12 such that some positive output is provided when no strain or torque is experienced (i.e., when the shaft 16 is at rest), and that zero volts from the bridge 27 corresponds to a maximum negative output, the optical signals can be used to indicate both positive and negative torques or strains experienced by the shaft 16.

In operation, as the shaft 16 rotates and experiences a torque thereon, an optical signal is generated by the light 28. The optical signal produced is in accordance with the magnitude of the torque or strain experienced by the shaft 16. This optical signal is received by the optical transmitting element 18 which is rotating with the shaft 16. The fiber optic strands 32 in the transmitting element 18 pick up the optical signal from the light 28 and produce a "ring" or "band" of illumination adjacent the rotating shaft 16. The magnitude of this illumination is sensed by the photo sensor 20. The output of the photo sensor 20 is then directed to the intensity meter 24 which provides an indication of the magnitude of the optical signal received. Thus, no slip rings or other like components are required to transmit the electrical signals produced by the bridge. By using optical signals, the apparatus 10 is also not susceptible to electromagnetic interference which could be troubling for previously developed systems employing conventional slip rings.

The various components of the circuit 14 are widely commercially available. The U-shaped members 18a and 18b of the transmitting element 18 can be formed in a variety of ways, such as by injection molding. The fiber optic strands 22 could be inserted into each of the members 18a and 18b after drilling a suitable member of evenly spaced holes in the members 18a and 18b. Since the members 18a and 18b may be uncoupled from one another, the transmitting element 18 can be removed from the shaft 16 and used with a different shaft if needed.

FIG. 6 illustrates an alternative embodiment 18' of the U-shaped members in which the fiber optic strands are oriented generally parallel to the rotating shaft 16. This embodiment is adapted for applications where it is more advantageous or necessary to place the photo sensor 20 at the end of the shaft rather than along side it.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

We claim:

1. An apparatus for detecting torque experienced by a rotating member, comprising:

a sensing circuit having a light generating element, said sensing circuit being mounted on said rotating member for sensing torque experienced by said rotating member during rotation and causing said light generating element to generate an optical signal in accordance with a magnitude of said sensed torque;

a light transmitting member disposed on said rotating shaft to rotate therewith for receiving said optical signal and transmitting said optical signal to an optical sensing device; and an optical sensing device disposed adjacent said rotating member for receiving said optical signal from said light transmitting member and transmitting said optical signal to a measurement device;

said light transmitting member comprising a pair of U-shaped members adapted to be coupled to one another around a portion of said rotating shaft and a plurality of fiber optic strands formed therein, said strands having first ends that are orientated so as to face said light generating element and second ends that are orientated to face away from said rotating shaft:

at least one fastening member for coupling said pair of U-shaped light transmitting members removably to said shaft; and wherein said U-shaped members generate a band of light around said rotating shaft which may be received by said optical sensing device at any point around the circumference of said rotating shaft.

2. The apparatus of claim 1, wherein said sensing circuit comprises:

a plurality of resistive elements secured to said rotating member;

a bridge circuit responsive to said resistive elements for generating an electrical signal in accordance with torque experienced by said rotating member during rotation thereof; and said light generating element being responsive to said electrical signal for generating said optical signal, said optical signal having a magnitude which varies in accordance with said torque sensed by said resistive elements.

3. The apparatus of claim 1, wherein said fiber optic strands are disposed within each of said U-shaped members so as to extend radially from an outer surface of said rotating member.

4. The apparatus of claim 1, wherein said fiber optic strands in each of said U-shaped members are disposed so as to extend longitudinally through each of said U-shaped members generally parallel to said rotating member.

5. The apparatus of claim 2, further comprising a battery for powering said bridge circuit, said battery being disposed on said rotating member to rotate therewith.

6. An apparatus for detecting torque and strain experienced by a rotating member, said apparatus comprising:

a plurality of resistive sensing elements disposed on said rotating member for sensing torque and strain experienced by said rotating member during rotation thereof;

an electrical circuit responsive to said resistive elements for generating an electrical signal representative of said torque and said strain;

a light responsive to said electrical signal for generating an optical signal in accordance with said electrical signal, said optical signal varying in magnitude in accordance with variations in said electrical signal;

an optical transmitting element coupled to said rotating shaft, said optical transmitting element having a plurality of fiber optic strands for receiving said optical signal and transmitting said optical signal from said rotating shaft;

an optical sensing element for receiving said optical signal transmitted from said optical transmitting element and transmitting an output signal in accordance therewith to a measurement device; and said optical transmitting element comprising a pair of U-shaped members adapted to be clamped to each other around said rotating member to rotate therewith and each including a plurality of fiber optic strands which receive said optical signal and which produce a band of light around said rotating member which is able to be received at any point about the circumference of said rotating member.

7. The apparatus of claim 6, wherein said electrical circuit further comprises a battery for providing power thereto, said battery being disposed on said rotating shaft to rotate therewith.

8. The apparatus of claim 6, wherein said fiber optic strands disposed within said U-shaped members extend radially outwardly of an outer surface of said rotating shaft when said U-shaped members are secured to each other around said rotating shaft.

9. The apparatus of claim 6, wherein each of said U-shaped members comprises a plurality of fiber optic strands disposed therewithin so as to extend generally parallel to an outer surface of said rotating shaft when said U-shaped members are secured to said rotating shaft.

10. A method for sensing forces experienced by a rotating member during rotation, said method comprising the steps of:

using sensing elements mounted on said rotating member for sensing said forces;

generating an optical signal in accordance with said sensed forces;

using a pair of optical transmitting elements formed by U-shaped members to receive said optical signal, said U-shaped members being clamped to said rotating member so as to rotate therewith, wherein said U-shaped members have a plurality of fiber optic strands embedded therein which receive said optical signal and generate a band of light having an intensity related to said optical signal around said rotating member which may be received by an optical sensing device at any point about the circumference of said rotating member; and using an external optical sensing element for receiving said band of light and generating an electrical signal in accordance therewith indicative of said sensed forces.

11. The method of claim 10, wherein the step of using a plurality of fiber optic strands to receive said optical signal comprises disposing said strands such that said strands extend radially from an outer surface of said member.

12. The method of claim 10, wherein said step of using fiber optic strands to receive said optical signal further comprises the step of orientating said fiber optic strands such that said strands extend generally parallel to an outer surface of said rotating member.

13. The method of claim 10, wherein the step of using fiber optic strands to receive said optical signal comprises the step of disposing said fiber optic strands closely adjacent said light and adjacent said rotating member such that said fiber optic strands receive said optical signal directly from said light.

* * * * *